United States Patent Office 3,525,022
Patented Aug. 18, 1970

3,525,022

MAGNETIC MEMORY SWITCH

Albert Regnier, Issy-les-Moulineaux, and Fernand Silerme, Creteil, France, assignors to International Standard Electric Corporation, New York, N.Y., a corporation of Delaware Filed Jan. 12, 1965, Ser. No. 425,010
Claims priority, application France, Jan. 17, 1964, 960,728
Int. Cl. H01h 47/00
U.S. Cl. 317—155.5 1 Claim

ABSTRACT OF THE DISCLOSURE

A glass reed matrix includes a yoke structure which uses crosspoint contacts controlled by two pair of coils, each pair being individually associated with either an X or a Y coordiate, respectively. The contacts release if they are associated with a pair of coils which are energized in a single coordinate direction. But, the contacts operate if they are associated with coils at the intersection of two energized coordinate directions.

This invention relates to magnetically controlled switching devices of a four-coil type—especially, although not exclusively suitable for use in telephone or like switching networks.

Devices of the type preferred to herein have magnetically controlled-latching contact means. They are given a magnetic memory owing to the remanence feature of the magnet members. The crosspoints are controlled by current pulses applied to multiple windings which set the proper induction in said magnet members.

These known crosspoints have to meet the following conditions in view if the use thereof in coordinate switching arrays; (1) they shall be provided with two energization circuits, each circuit being associated with a coordinate in the array; (2) the contact means shall be released when either energization circuit is operated singly, and (3) the contact means shall be operated when both energization circuits are energized in a given sequence. In a coordinate array of such devices, the coordinate energization circuits is formed by connecting the corresponding energization circuits of the crosspoint devices along every coordinate ($x$ or $y$). Then, when two such circuits associated with two selected coordinates ($x$ and $y$) are energized, one circuit is energized in all crosspoint devices along both coordinates, so that all of these crosspoint devices are released except for the one at the crosspoint of these energized coordinates. In that one crosspoint, both circuits are energized so that it will be operated. Devices of this type are known and have been described, in the Bell System Technical Journal, No. 1 of 1960, pages 1 to 30, and in the U.S. Pat. Nos. 3,037,085, 3,005,876, 3,059,-075 and 3,070,677.

In one modification of those known devices, two pair of windings are symmetrically placed on two magnetic cores to induce flux in them which is either in series or in opposition. The contact means are operated by a leakage flux from the cores when they have flux induced in opposition, and they are released when the cores have flux induced in series aiding. Either pair of windings comprises a main winding on a first core and another winding on the other core, the two windings being wound to induce flux in series aiding. Each core carries the main windings of a pair and the other winding of the other pair. The coils in the two main windings are turned in a direction which induces the flux in opposition. Therefore, the two main windings on either core induce flux in opposite directions. When both pair of windings are energized, the core flux is induced in opposition by the main windings which are acting against the flux in the other windings. To this end, the main windings are given a magneto motive force double of the others.

Other devices of this type, are described in our co-pending application entitled, "Magnetic Memory Switch and Array," S.N. 423,226 filed Jan. 4, 1965, and assigned to the assignee of this invention. However, in these other devices, covered by our co-pending application, the main windings do not have a force double the force of the other windings. The two windings on each core balance one another. However, the main windings are supplied with pulses which last longer than the pulses supplied to the other windings. When either pair of windings are energized singly, the flux in the two cores is induced in series aiding by equal magnetomotive forces, and the device releases. When both pairs of windings are energized with the described time relationships, the two windings on each core first balance one another, without any effect, and then the main windings stand energized alone by the longer pulses. This long pulse induces opposing flux in the two cores and the crosspoint contact device is operated.

One object of this invention is to provide a multipolar embodiment of a crosspoint switch device, as stated above.

In another modification of four-coil crosspoint devices, the contact means comprise two magnetic members. The same two pairs of windings are similarly placed on these members to induce flux in them, either in series or in opposition. In this modification, the contact means are operated by the main flux in the members when the flux is induced in series. The crosspoints release when the flux is induced in opposition (assuming, indeed, that some magnetic stray path is provided from between the two members about their contacting ends).

Another object of this invention is to apply the energization current, according to the teachings of our co-pending application, to this other modification of the four-coil devices.

Still another object is to provide a multipolar embodiment of a crosspoint device according to the last said object of this invention.

According to another feature of this invention, a multi-embodiment of the crosspoint switching device of the four-coil type, described in our co-pending application is provided. The magnetic circuit comprises two square (or similar) yokes. The two magnet cores carrying the four coils are assembled at the ends of a diagonal of these yokes. The contact means, such as soft magnetic reeds to be operated by the leakage flux, are mounted on the other daigonal of the yokes. These yokes have sufficient permeance (e.g. owing to the thickness thereof) to distribute the leakage flux equally between the magnetic reeds. Preferably, the pattern of the yokes is symmetrical at least with respect to one diagonal. Thus, identical yokes may be used both sides of the magnetic circuit.

According to another feature of this invention, a switching device of the four-coil type is provided. The contact-making magnetic members are arranged in the path of the main flux. In this modification, the four coils are similarly placed on the two magnetic members. Thus, the two windings, of either pair of windings, induce flux in the members in opposition to release the crosspoint device. When no longer balanced by the other windings, the two main windings induce a flux in the core members, in series to operate the crosspoint device. The two windings on either member still balance one another.

According ot another feature of this invention, a multipolar embodiment of the last stated switching device is provided. A plurality of separate contact means, such as magnetic reed contacts sealed in glass tubes, are arranged within the coils. The four windings are then arranged around a group of separate contact means.

The above mentioned and other features and objects of this invention and the manner of obtaining them will become more apparent, and the invention itself will be best understood by reference to the following description of an embodiment of the invention taken in conjunction with the accompanying drawings, in which.

Figures 1, 2:
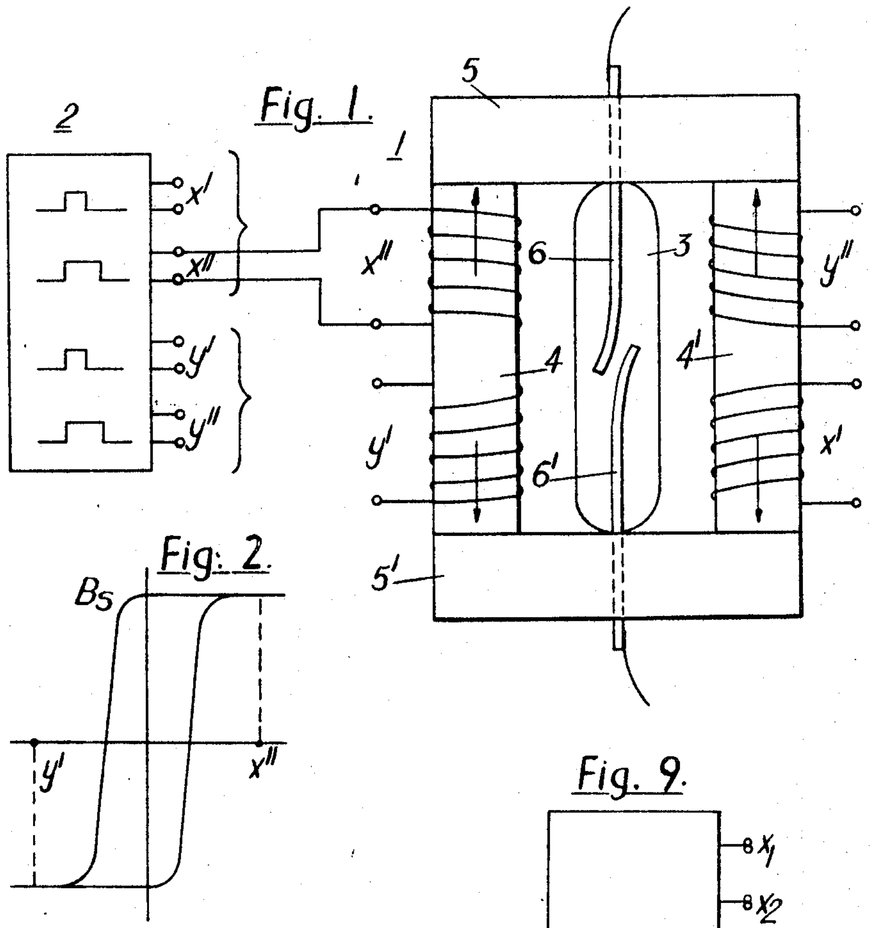
FIG. 1 is a schematic view of a switch device of the four-coil type of crosspoint, referred to hereinabove.
FIG. 2 is a diagram showing the induction in a square-loop magnetic material.

In FIG. 1, the crosspoint switch device comprises a magnet circuit 1, pulse supply means 2 (adapted to energize a four-coil inductor device on said magnetic circuit), and magnetically controlled contact means 3, such as a reed contact in a glass tube.

The magnetic circuit 1 comprises two magnetic cores 4, 4' which are magnetically coupled together by yokes 5, 5'. The four-coil inductor comprises coils $x''$ and $y'$ on core 4 and coils $x'$ and $y''$ on core 4'. All coils have the same number of ampere-turns so that, when energized, each generates the same magneto motive force. Preferably, they have the same number of turns and are supplied with pulses of the same current value. However, two coils on either core work in opposition. Thus, they balance one another when both are energized. This gives no net induction effect in the core.

Coils $x'$ and $y'$ form a first pair of coils to be energized together, and coils $x''$ and $y''$ form a second pair to be energized together. First windings $x$ in each pair form a coordinate $x$ in a coordinate array, and second windings form a coordinate $y$. The two pair of coils are placed symmetrically on the cores. Coil $x''$ induces core flux upwardly, as shown by the arrow inside coil $x''$. Coil $y''$ likewise induces core flux upwardly, i.e. in opposition to the flux in the magnetic circuit resulting from coil $x''$. Then, coil $x'$ is opposed to coil $y''$, and it induces core flux downwardly i.e. in series with flux from coil $x''$ in the magnetic circuit. Coils $y'$ and $y''$ also will induce the flux in the cores in series aiding.

The contact reeds 6, 6' are made of soft magnetic material. They are brought together or operated by the stray flux from the magnetic circuit when the cores are magnetized in opposition, and they are released when the cores are serially magnetized in either direction.

While the pulse supply means 2 is energizing the coils in either pair, the pulses supplied to coils $x''$, $y''$ are made longer than the pulses supplied to coils $x'$, $y'$. Assuming that the $x$ windings are energized, the flux in the cores 4 and 4' is in series aiding. This flux reverses the flux in either core, or in both, as the case may be, depending upon the initial condition of the cores. Anyway, contacts 6, 6' open at once. Or, they are kept open. Then the pulse in coil $x'$ stops, leaving the remanent induction in core 4'. At last, the pulse in coil $x''$ stops, leaving remanent induction in core 4. The remanent induction holds the contact means in the released condition.

Assume now that both pairs of coils are energized. The flux from two coils on either core first balance one another, with the initial induction, whatever it may be. Then, the longer pulses acts alone in coils $x''$ and $y''$ on cores 4 and 4'. The flux in the cores is induced in opposition, reversing the induction in one core, depending upon the initial induction in the cores. Anyway, contacts 6, 6' close, or are kept closed. At last, the pulses in coils $x''$, $y''$ stop, leaving the remanent induction in the cores. This remanance latches or holds the contact means operated.

When two such crosspoint devices are energized at once, one is operated and the other is released. One is released at once when all four pulses coincide, and the other is operated a little later, when the shorter pulses stop. This feature right fits the wanted transfer operation in a switching network.

The cores may be made of square-loop magnetic material, having an induction characteristic, as shown in FIG. 2 (for core 4). When only the $x$ coils are energized, coil $x''$ swings the induction upward to the value $B_s$ (or, it leaves it unchanged if a core is initially magneticed upwards). When only the $y$ coils are energized, coil $y'$ swings the induction downwards to the same value (or leaves it unchanged). When both pairs are energized together, coils $x$ and $y$ first balance one another to give a zero field in core 4, or leave the induction unchanged, depending upon the initial state. Then, coils $x''$, $y''$ remain energized alone, and swing the induction upwards (or leave it unchanged if initially upward). Since there is but one induction value in either direction, the remanent magnetic condition is able to operate the contact in the same manner as the energized coil operates the contact. Hence, the pulses can be made shorter than the switching time of the contact means, provided that the pulses are long enough to cause the wanted magnetic reversals.

Figure 3:
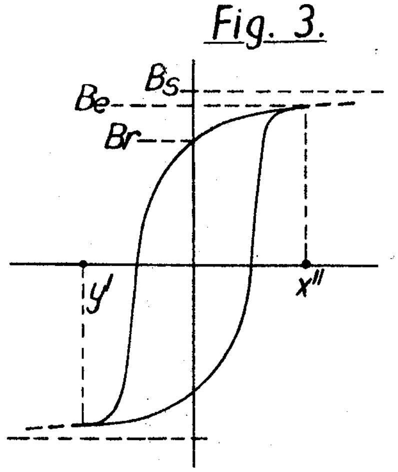
FIG. 3 is a similar diagram for another magetic material.

In practice, however, it is more practical to make the cores of some other magnetic material, having a less square loop characteristic as shown in FIG. 3. There are three induction values, i.e.: $B_s$ for the saturated condition, $B_e$ for the energized condition (with fields from coils $x$ or $y$ substantially weaker than they would be to reach the saturated condition), and $B_r$ for the remanent condition. The remanent induction $B_r$ may be able to operate the contact means and this would enable the use of very short pulses. Preferably, however, only the energized induction $B_e$ is able to operate the switch. Then, the only holding force that is required results from the lower remanent induction $B_r$. Here, the pulses must last long enough to cover the switching time of the contact means.

Figure 4:
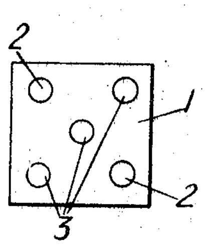
FIG. 4 is a plan view which shows a yoke for a three-pole relay which embodies the invention.
Figure 5:
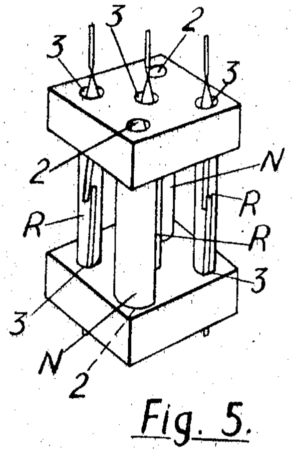
FIG. 5 is a perspective view of this relay.

Referring now to FIG. 4. The yoke of the multipolar embodiment of a crosspoint switch is a square block 1 provided with five assembly holes or notches. One hole is at each corner, and one is in the middle. Diagonally opposite holes 2 to receive the ends of the remanent cores. The three other holes 3, receive the ends of the reed relay contacts. The yoke is symmetrical with respect to both of its diagonals, but holes 2 may differ from holes 3. Two identical yokes may thus be mounted at both ends of the device, as seen from FIG. 5. The coils N are mounted on the cores of the magnetic circuit, and the magnetic reed contacts are shown in their glass tubes.

Figure 6:
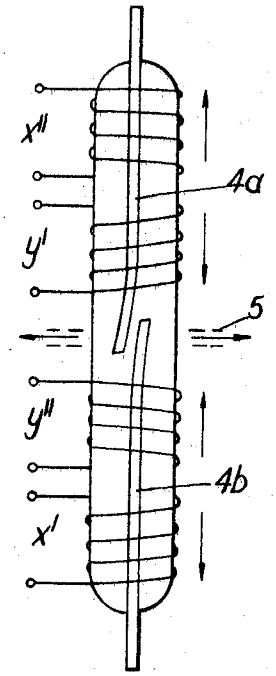
FIG. 6 is a schematic view of a modification of the switching device of FIG. 1, according to this invention.

To energize a relay, the magnetic reeds are placed in the main magnetic path, is shown in FIG. 6. The two coils of either $x'$ and $x''$, or $y'$ and $y''$, are mounted in magnetic opposition on the two ends of the reeds *4a*, *4b*. Thus, when only one set of coils is energized, the reeds reel one another, and the contact opens. A magnetic member 5, shown in dotted lines, may be provided at the mid-point level of the contact, to divert the resulting flux from the contact point. The corresponding coils of both $x'$ and $y'$, or $x''$ and $y''$, are magnetically in series.

The two coils on either reed, $x''$ and $y'$, or $y''$ and $x'$, are in magnetic opposition, Thus, when all coils are energized (i.e. the relay is energized at both coordinates in a coordinate array), the fields of the coils on the reed balance one another. Then, after the end of the shorter pulses in coils $x'$ and $y'$, the two main coils $x''$ and $y''$ remain energized by the longer pulses. The resulting flux then magnetizes the reeds in series and cause them to attract each other, thus closing the contact.

Figure 7:
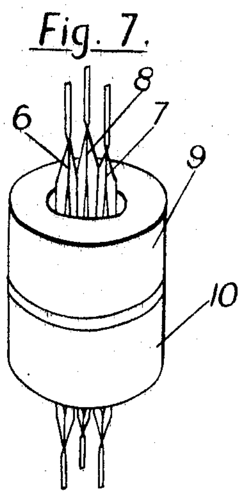
FIG. 7 is a perspective view of a three-pole relay which embodies this modification.

FIG. 7 illustrates a three-pole crosspoint switch device constructed according to the modification of FIG. 6. The three pairs of reeds—each in its own glass tube, 6, 7 and 8—are placed within coils 9, 10. It will be understood that coil 9 may comprise coils $x''$ and $y'$ of FIG. 6, while coil 10 may comprise coils $y''$ and $x'$ of FIG. 6, for example.

It will be further understood that the above description of particular embodiments of this invention does not limit the scope thereof. For instance, the remanent magnetic members, and particularly the contact reeds of FIGS. 6 and 7, may be replaced, in a well known manner, by soft magnetic members, completed by small magnets capable of creating a sufficient magnetic moment.

Figure 8:
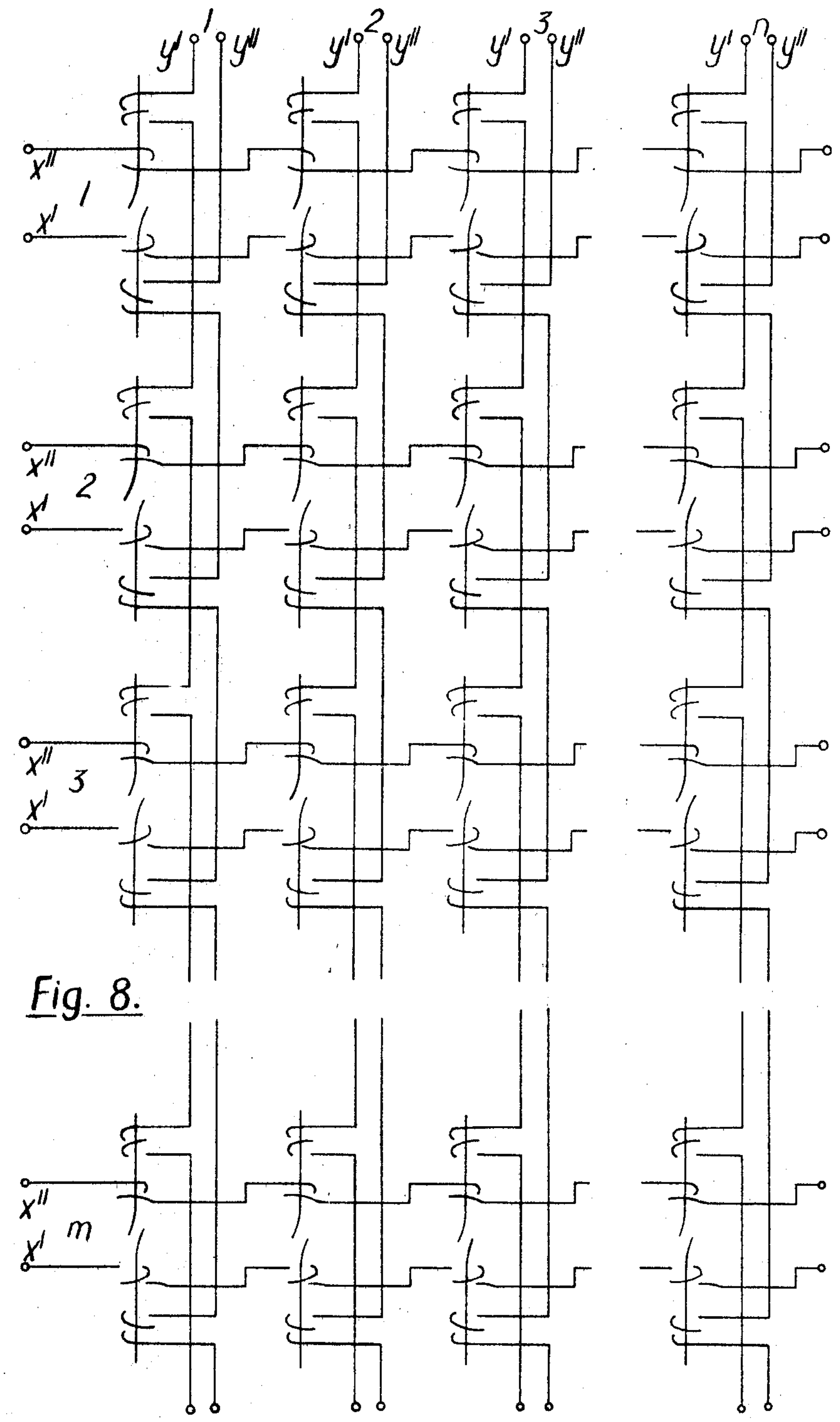
FIG. 8 shows a coordinate array of switching devices using the modification of FIG. 6.

FIG. 8 shows a coordinate array of relays or switching devices of FIG. 6 (including the multipolar embodiments, similar to that of FIG. 7). The coils of the same prime powers in the devices in each row (coordinates $x$, for example) are connected in series to form two energizing circuits $x'$, $x''$ associated with that row. The other coils of the same prime powers in the devices in each column (coordinates $y$) are also connected in series to form two energizing circuits $y'$, $y''$ associated with that column. When the circuits associated with a selected $x$-coordinate and with a selected $y$-coordinate are energized, all crosspoint devices along both of these coordinate, except for the one crosspoint at the crossing thereof, has one pair of coils energized. Hence, all will release at once, if they are not yet in a released condition. The crosspoint device at the crossing of the coordinates has both pairs of coils energized and operates as soon as the main windings are no longer balanced by the shorter pulses in the other windings.

Figure 9:
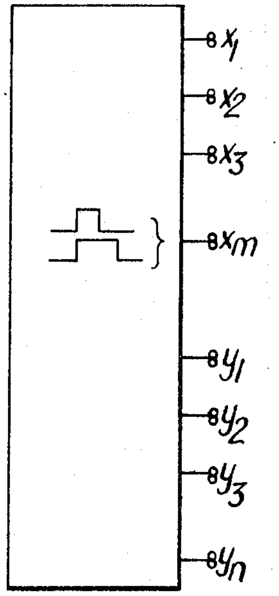
FIG. 9 schematically shows a pulse source adapted to supply control pulses to the array of FIG. 8.

FIG. 9 shows schematically a pulse supply device adapted to supply the energization circuits of FIG. 8. There is an output (including a short-pulse output and a long-pulse output) for each coordinate $x$ ($x_1$ to $x_m$) and for each coordinate $y$ ($y_1$ to $y_n$). Of course, these outputs are controlled by suitable coordinate selection means, not shown, as is usual in the art. One $x$ multiple and one $y$ multiple are energized together in a conventional switching matrix, and one $x$ and two $y$ in a twofold switching matrix where an input at a $y$-multiple and an output at another $y$-multiple are to be connected through a $x$-multiple.

While the principles of the invention have been described above in connection with specific apparatus and applications, it is to be understood that this description is made only by way of example and not as a limitation on the scope of the invention.

What we claim is:

1. A magnetic switching device comprising a first and a second core member in a yoke device, said yoke device comprising individual yokes spaced apart by said core members and forming a magnetic loop with said core members, said switching device comprising a plurality of contact means each with at least two contact making elements, , said contact elements extending between said individual yokes and positioned such that said contact elements close when an opposing flux is induced in said individual yokes and open when a series flux is induced in said individual yokes, a main winding and another winding on each of said core members, a source of control pulses for individually furnishing pulses for each of said windings, said pulses having at least two different periods, means for connecting the control pulses of the two different periods to energize the main windings of each of said pair of said windings over periods of time which are longer than the periods which the other of each of said pair of windings are energized, and said windings being wound so that the main winding on the first of said core members and the other windings on the second of said core members induces a clockwise flux in the magnetic loop, the main winding on the second of said core members and the other winding on the first of said core members induces a counterclockwise flux in the magnetic loop whereby the energized windings on each of said core members induces a balancing flux on said core members and provide no flux in said yokes, so that the energization of either of the clockwise flux producing windings or of said counterclockwise flux producing windings alone release said contact elements and the simultaneous energization of the clockwise flux producing and the counterclockwise flux producing windings operates said contact elements to a closed position after the end of said periods during which the other of each of said pair of windings are energized.

References Cited

UNITED STATES PATENTS

| | | | |
|---|---|---|---|
| 3,134,908 | 5/1964 | Ellwood | 317—155.5 XR |
| 3,206,649 | 9/1965 | Feiner | 317—137 |
| 3,256,425 | 6/1966 | Deeg | 317—155.5 XR |
| 3,327,178 | 6/1967 | Deeg | 317—155.5 XR |
| 3,183,487 | 5/1965 | Deeg | 340—166 |
| 2,995,637 | 8/1961 | Feiner et al. | 335—182 XR |

DONALD J. YUSKO, Primary Examiner

U.S. Cl. X.R.

335—152